(12) United States Patent
Arnon et al.

(10) Patent No.: US 10,639,846 B2
(45) Date of Patent: May 5, 2020

(54) METHOD FOR ANALYZING GAPS AND SHELL WEAK SPOTS FOR 3D OBJECTS AND GENERATING SUPPORT STRUCTURES THAT FILL THE GAPS AND SHELL WEAK SPOTS

(71) Applicant: Massivit 3D Printing Technologies LTD., Lod (IL)

(72) Inventors: Gilad Arnon, Lod (IL); Yoav Miller, Rehovot (IL); Yoav Aboudi, Kiriat Ono (IL)

(73) Assignee: Massivit 3D Printing Technologies LTD., Lod (IL)

( * ) Notice: Subject to any disclaimer, the term of this patent is extended or adjusted under 35 U.S.C. 154(b) by 30 days.

(21) Appl. No.: 15/578,766

(22) PCT Filed: Jun. 19, 2016

(86) PCT No.: PCT/IL2016/050642
§ 371 (c)(1),
(2) Date: Dec. 1, 2017

(87) PCT Pub. No.: WO2017/009820
PCT Pub. Date: Jan. 19, 2017

(65) Prior Publication Data
US 2018/0311897 A1    Nov. 1, 2018

Related U.S. Application Data

(60) Provisional application No. 62/191,575, filed on Jul. 13, 2015.

(51) Int. Cl.
*B29C 64/245* (2017.01)
*B29C 64/386* (2017.01)
(Continued)

(52) U.S. Cl.
CPC .......... *B29C 64/245* (2017.08); *B29C 64/106* (2017.08); *B29C 64/124* (2017.08); *B29C 64/386* (2017.08); *B29C 64/393* (2017.08); *B33Y 10/00* (2014.12); *B33Y 30/00* (2014.12); *B33Y 50/00* (2014.12); *B33Y 50/02* (2014.12)

(58) Field of Classification Search
CPC ................................ B33Y 50/02; B33Y 50/00
See application file for complete search history.

(56) References Cited

U.S. PATENT DOCUMENTS

2012/0010741 A1* 1/2012 Hull .................... B29C 64/40
                                                         700/98
2013/0040091 A1  2/2013 Dikovsky et al.
(Continued)

OTHER PUBLICATIONS

International Search Report in PCT/IL2016/050642 dated Jan. 12, 2017.

*Primary Examiner* — Nathan L Laughlin
*Assistant Examiner* — Marzia T Monty
(74) *Attorney, Agent, or Firm* — Manelli Selter PLLC; Edward Stemberger

(57) ABSTRACT

An apparatus and method for generating support structures to 3D objects. The support structure could be located in an inner space or cavity of a hollow 3D object. In some examples, where the inner structure cannot support the designated segment of the 3D object, the support structure could be implemented outwards.

11 Claims, 6 Drawing Sheets

(51) Int. Cl.
  *B33Y 50/00* (2015.01)
  *B33Y 50/02* (2015.01)
  *B29C 64/106* (2017.01)
  *B29C 64/124* (2017.01)
  *B29C 64/393* (2017.01)
  *B33Y 10/00* (2015.01)
  *B33Y 30/00* (2015.01)

(56) References Cited

U.S. PATENT DOCUMENTS

| | | |
|---|---|---|
| 2014/0217647 A1 | 8/2014 | Pallari |
| 2014/0265032 A1* | 9/2014 | Teicher .................. B33Y 50/02 264/401 |
| 2015/0151492 A1 | 6/2015 | Schmidt |
| 2015/0269282 A1* | 9/2015 | Nelaturi .................. G06F 17/50 700/98 |
| 2017/0210063 A1* | 7/2017 | Andres .................. B33Y 40/00 |

* cited by examiner

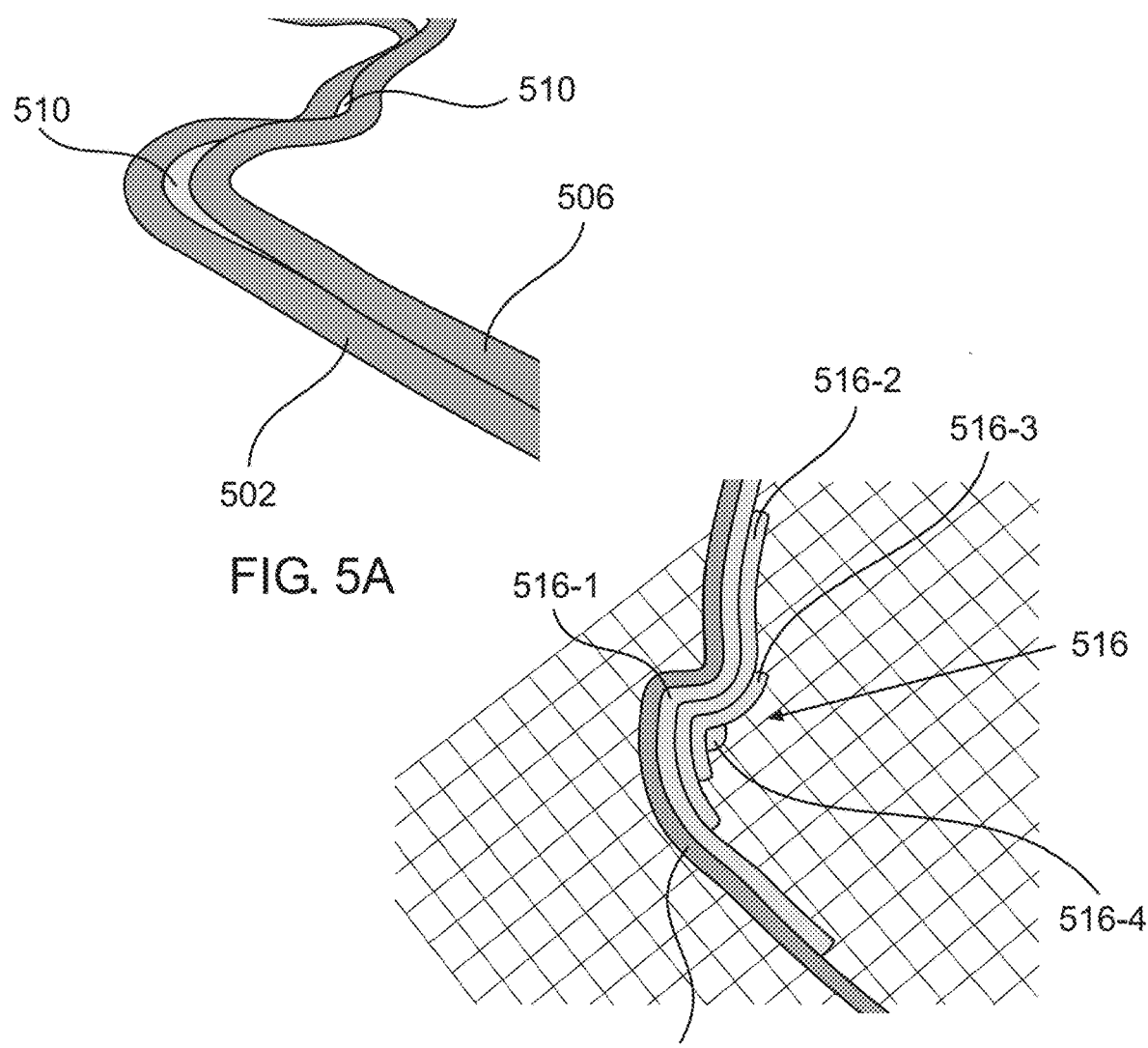
FIG. 5A
FIG. 5B
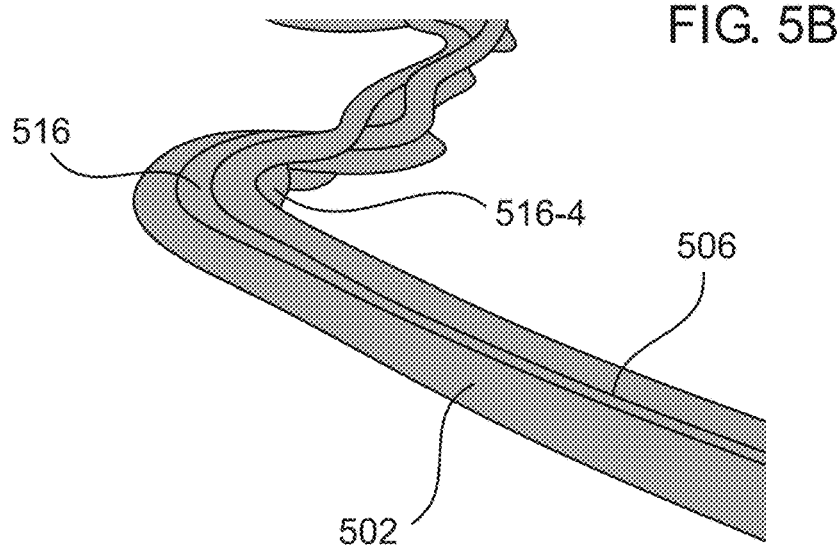
FIG. 5C

METHOD FOR ANALYZING GAPS AND SHELL WEAK SPOTS FOR 3D OBJECTS AND GENERATING SUPPORT STRUCTURES THAT FILL THE GAPS AND SHELL WEAK SPOTS

The present application includes by reference U.S. Pat. No. 8,974,213 and U.S. patent application Ser. No. 14/712,116 to the same assignee and which are all incorporated herein by reference in their entirety, and claims any and all benefits to which they are entitled therefrom.

TECHNOLOGY FIELD

The apparatus and method relate to the field of three-dimensional (3D) printing and in particular to printing support structures for a 3D object.

BACKGROUND 3D printing is an additive manufacturing process. Printing or manufacturing an object is a process of adding material layer by layer. Each layer could be added on top of an earlier printed layer or on the bottom of an earlier printed layer. The printing process is relatively straightforward, when a simple object with straight and vertical walls, such as a parallelepiped or a similar object should be printed. However, most objects are not so simple in structure and include curved surfaces and surfaces that could overhang outside the main body of the object or in case a hollow object, protrude into a hollow void or cavity inside the object defined by the object walls. The surfaces could be inclined, oriented at different angles and have different thicknesses or sizes. Different size material layers (narrower or broader) could be required to print such objects.

Printing or manufacture of such protruding or overhanging surfaces is usually accomplished by introduction of so called support structures similar to scaffolds used in building construction. Some of the scaffolds, especially these that affect object appearance are removed after object completion and others could remain.

Different techniques are used to determine and print the scaffolding or support structures. Usually, the support structures are made of the same material of which the 3D object is made, although use of other and different materials is known, for example U.S. Pat. No. 8,974,213 to the same assignee discloses use for support structure of different material than the material the 3D object is made.

Some of the printers automatically create support structures. For more complex objects operator intervention could be required. This slows down the 3D object generation process and largely depends on the operator expertise.

Methods for manufacture of such supports or reinforcement structures are described for example, in U.S. Pat. Nos. 5,595,703; 6,797,351; 8,285,411; and US Patent Application Publication 2010/0042241.

Glossary

"Shell"—as used in the current disclosure the term shell means a structure or a physical object, usually hollow inside, the wall thickness of which is small compared to its other dimensions. The shell structure could be a curved structure with a curvature of second or higher power; although in some examples it could have certain flatness or flat segments.

"Gap"—as used in the current disclosure the term gap means a difference in physical location of two neighbor layers that are supposed to completely overlap each other.

"3D physical object shell material" or "shell material"—as used in the current disclosure means the material from which the shell is manufactured.

"Support material"—as used in the current disclosure the term support material means material from which the shell material support is made.

"Conventional support"—as used in the current disclosure the term conventional support means support structures known at least from the references listed.

The terms "3D hollow object" and "shell" are used interchangeably in the current disclosure and have the same meaning.

The term "sharp angle" as used in the current disclosure means angles smaller than 90 degrees.

The term "Shell Weak Spot" or "Shell Weak Space or Volume" as used in the current disclosure means a defined area in the printed 3D object shell that is determined by analyses as a space that require support or reinforcement.

SUMMARY

The current document discloses an apparatus and method that support manufacture of large 3D hollow objects or shells with thin walls including curved walls and surfaces extending inward and outward from the object. The support structure generated by the present method and apparatus are based on the 3D object shape, follows it and becomes an integral part of the 3D object inner structure. This removes the need of removing the support structure after the 3D object printing is accomplished. The disclosed support structure is generated by attaching a material segment or fragment to an already printed 3D object layer. The attached or additional material segment or fragment could be located in an inner space or cavity of a hollow 3D object.

In some examples where the inner structure cannot support the designated segment of the 3D object, the support structure could be implemented outwards. To avoid affecting the external appearance of the 3D object such outward support structure could be done with soluble substances. Upon completion of the printing, soluble substances could be easy removed and do not affect the external appearance of the 3D object printed.

The morphology/topography of the disclosed support structure follows the morphology/topography of the 3D object and hence becomes an integral part of the 3D object preventing the need of removing the support after the 3D object printing is completed. In some examples, the support structure could be a continuous support structure. The attached material fragment reinforces the prone to collapse segments of the 3D object and eliminates the need of additional support structures.

LIST OF FIGURES AND THEIR BRIEF DESCRIPTION

FIGS. 5A-5C are schematic illustrations of stages in printing an inner support structure according to an example.

DESCRIPTION

Figure 1:
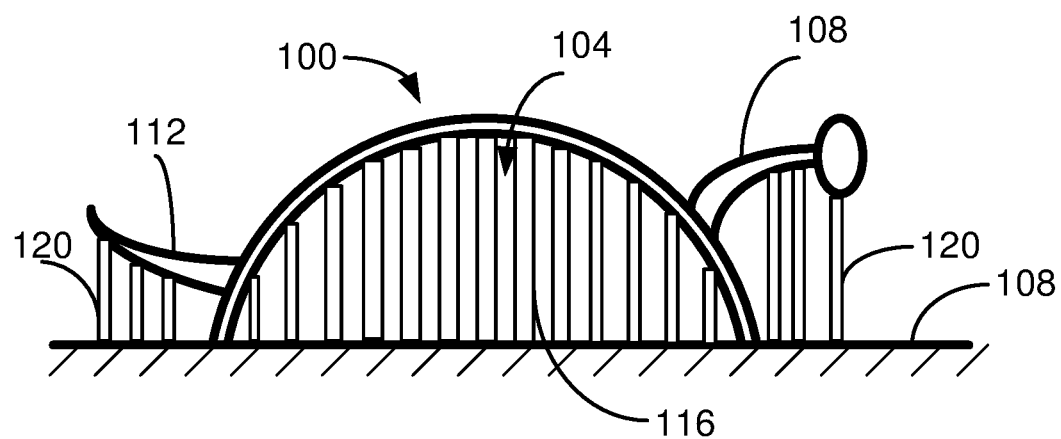
FIG. 1 is a cross section of an example of a 3D object printed or generated by known methods.

FIG. 1 is a cross section of an example of a 3D object printed or generated by known methods. Object 100 is a large object and could be of few meters in each dimension (height, length and width). Object 100 could include a hollow cavity or inner segment 104 of a shell and one or more segments 108 and 112 protruding or extending out of spherical cavity or shell 104. Segments 108 and 112 of 3D object 100 could be large in size and have curved surfaces and/or walls. During printing of object 100, once a segment 108/112 reaches a certain size, the wall segment could become unstable and even collapse. Currently, to avoid collapse of the flat tilted and horizontal walls as well as extending out segments, such 3D objects or models are manufactured by providing numerous internal 116 and external 120 supports or reinforcement structures. Support structures can be made of the same material of which the 3D object is made. Support structures 116 are located in the inner segments of 3D object 100. Such support structures are not visible to the observer and do not affect visual perception of the 3D object. Support structures 120, however, are visible to the observer and need to be removed upon completion of 3D object printing. Removal of such support structures significantly increases the 3D object production time, consumes costly material, and requires additional labor to remove some of the unnecessary material.

In most of the manufacturing applications, where large size 3D objects or models are produced by additive manufacturing processes, the external appearance or segments of the object exposed to an observer is more important than the inner segments or volumes of the 3D hollow object or shell. Such 3D objects are usually manufactured by producing relatively thin shells of for example, shells with walls having 1 mm to 5 mm or even 8 mm thickness. The size of the manufactured 3D object could be significant for example, between 100 mm by 100 mm; 1000 mm by 1000 mm or even 10000 mm by 10000 mm. In addition, the 3D object could include large segments with curved surfaces and walls. During printing of an object, once such segments reach a certain size, the wall segments tilt and curvature of the shell walls could become unstable and even collapse. Currently, to avoid collapse of flat tilted and horizontal walls as well as extending or protruding segments of such 3D objects or models are manufactured by providing numerous inner and external supports structures made of the same material as the 3D object is made.

The current document discloses an apparatus and method that support manufacture of large 3D hollow objects or shells with thin walls including curved walls and surfaces extending from the object (outward) or protruding into the inner space (inward) of the object. The support structures generated by the present method and apparatus alleviate or significantly reduce the need for conventional support structures or scaffolds, and in particular external support structures. The support structure shape is based on the 3D object shape, follows it and becomes an integral part of the 3D object inner structure. This removes the need of removing the support structure after the 3D object printing is accomplished.

The disclosed support structure utilizes a technology developed by the authors of the disclosure to print and attach a material segment or fragment to an already printed 3D object segment. The attached material segment reinforces the prone to collapse segments of the 3D object and eliminates the need of additional support structures. The attached or additional material segment or fragment could be located in an inner space or cavity of a hollow 3D object. In some examples where the inner structure cannot support the designated segment of the 3D object, the support structure could be implemented outwards. To avoid affecting the external appearance of the 3D object such outward support structure could be done with soluble substances. Upon completion of the printing, soluble substances could be easy removed and do not affect the external appearance of the 3D object printed.

The morphology/topography of the disclosed support structure follows the morphology/topography of the of the 3D object and hence becomes an integral part of the 3D object preventing the need of removing the support after the 3D object printing is completed. In some examples, the support structure could be a continuous support structure. Continuous material deposition or printing is usually faster than printing of fragments or sections of the support structure. In addition, continuous material deposition supports better connection between fragments of the support structure of the 3D object.

Figure 2A:
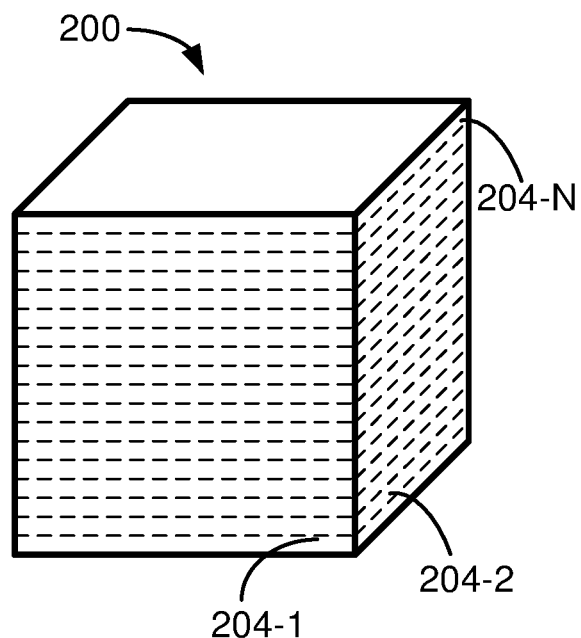
FIG. 2 is a schematic illustration of a 3D object into 2D layers virtual slicing technique and gap formation.
Figure 2B:
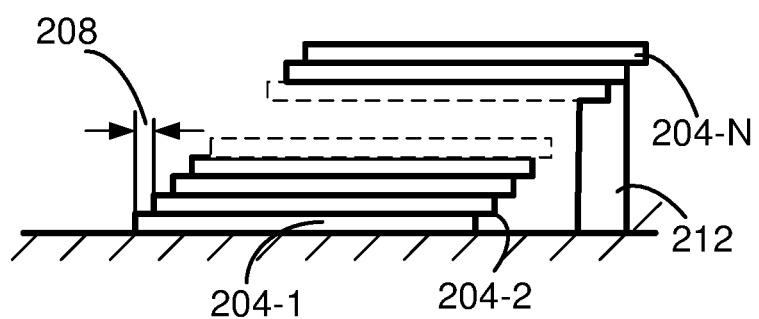

The layers of the 3D object are generated by virtually slicing a CAD generated 3D model 200 into a number of discrete 2D layers 204. As shown in FIG. 2, each of the 2D layers 204-1, 204-2 etc., may or may not lay exactly upon the layer beneath or above it. In the current disclosure the difference in physical location of two neighbor layers for example 204-1 and 204-2 is termed gap.

For example, when a 3D object, such as object produced from model 200, is printed or manufactured, a support structure 212 could be added to the 3D object to prevent collapse of the overhanging part of the printed 3D object.

Figure 3:
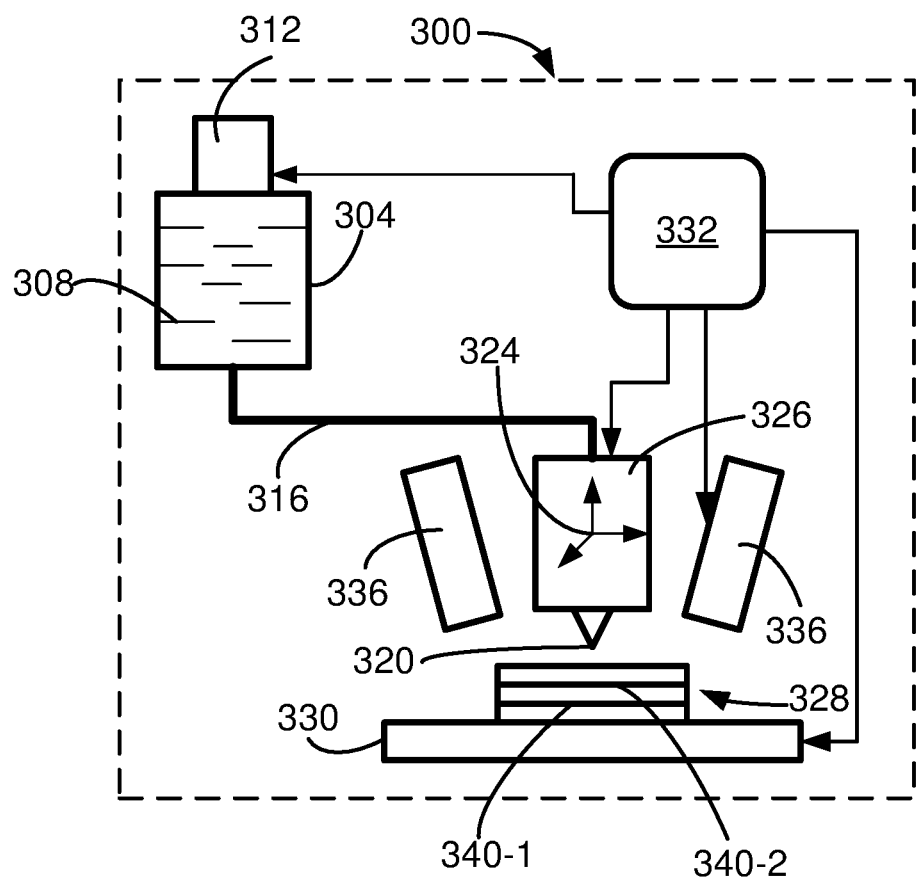
FIG. 3 is a schematic simplified illustration of a printer suitable for printing or manufacture by additive printing of three-dimensional structures in accordance with an example.

FIG. 3 is a schematic simplified illustration of a printer suitable for printing or manufacture by additive printing of three-dimensional structures in accordance with an example. 3D printing apparatus 300 includes a storage or material supply tank 304 adapted to store a curable or otherwise solidifying material 308, such as for example, a pseudoplastic high viscosity material disclosed in PCT/IL2015/050523, a pump 312 configured to agitate and shear thin the curable material 308, to reduce material 308 viscosity and cause the material to flow. Pump 312 in addition to agitation also develops a pressure higher than atmospheric pressure such that curable pseudoplastic material 308 flows through a delivery tubing 316 to an extrusion head 326 and in particular to extrusion nozzle 320. The higher than atmospheric pressure developed by the pump could be such as 0.1 bar to 30.0 bar and typically from 1.0 bar to 20.0 bar and sometimes 2.0 bar to 10.0 bar.

Apparatus 300 includes an X-Y-Z directional movement unit 324 configured to move the extrusion nozzle 320 in 3D space, i.e., in a three directions (X-Y-Z). Alternatively, a printing table 330 configured to support printed 3D object 328 could be made to move in a three coordinate system. In another example, the movement in 3D space, i.e. in three directions (X-Y-Z) could result from combined movement in two or three directions (X-Y-Z) of both the extrusion nozzle 320 and printing table 330. Apparatus 300 also includes a processor 332 configured to control operation of movement unit 324 and table 330.

Processor 332 is further adapted to receive data regarding a three-dimensional object 328 being printed and generate from the received data the X-Y-Z movement commands such that the curable material 308 is extruded through extrusion head 326 and extrusion nozzle 320 in an image wise manner. The X-Y-Z movement could be performed in a vector mode or raster mode, depending on the object to be printed. Processor 332 could also be configured to optimize the selection of the printing mode as well as select the curing or other radiation power output provided by a material curing or solidifying system 336 based on the characteristics of the object being printed, material used and the curing requirements thereof.

Source of curing or solidifying radiation 336 operates in a continuous manner concurrently with the deposition of the curing material and the radiation is selected to cure or solidify curable material 308. Processor 332 could also be configured to control operation of source of curing radiation 336 and synchronize it with the printing mode. If the printed segment to be cured, is too small and there is concern if it will be proper exposed to UV or other curing radiation during the printing, processor 332 could issue a command and move aside printing head and nozzle, to expose the segment to UV, and only then it will resume the printing.

Processor 332 can receive data of a three-dimensional object 132 and generate from the received data the X-Y-Z movement commands and length of strips to be printed or deposited such as 340-1, 340-2 one above or below the other (spatial relation between the layers of a 3D object), such that the curable material 308 extruded through extrusion (head) extrusion nozzle 320 in an image wise manner resembles a slice of object 200 (FIG. 2). In a similar manner a following strip or a layer of the curable material 308 is deposited.

Figures 4A, 4B, 4C:
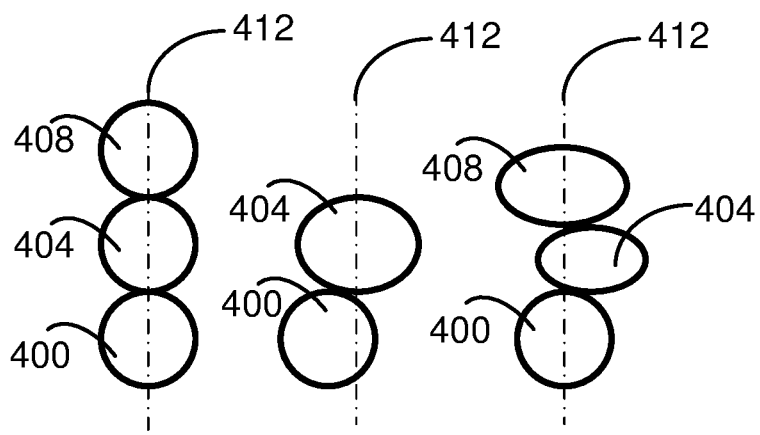
FIGS. 4A-4D are examples of spatial relation between different layers of a 3D produced in course of printing of the 3D object.
Figure 4D:
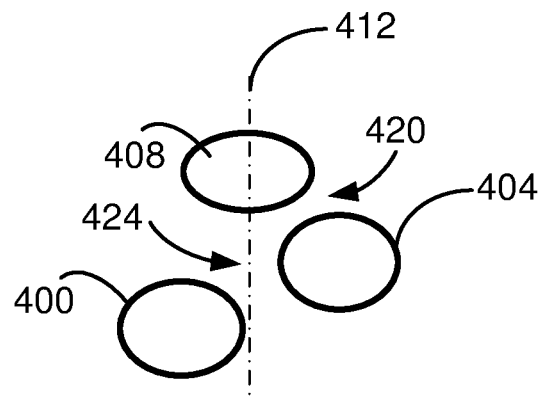

The decision on where and how to add the support structure depends on spatial relation between different layers (one above or below the other, one off at an angle from the other or any other spatial relation) of a 3D object produced in course of printing of the 3D object. FIG. 4 is an example of spatial relation between different layers of a 3D produced in course of printing of the 3D object. FIG. 4A illustrates an ideal case where all printed layers 400, 404 and 408, schematically shown by their cross section, have the same size and centers of the layers are located on the same axis 412. In practice, such example is rare. A variety of parameters related to environmental conditions, material condition and parameters and to the apparatus itself, affect the spatial relation between the printed layers. FIGS. 4B, 4C and 4D illustrate different spatial relations between the printed layers 400, 404 and 408. In one example, layer 400 printed earlier and located below layer 400 has only a partial spatial overlap with layer 404 that will be termed analyzed layer. FIG. 4C illustrates an example where layer 404 (analyzed layer) printed earlier then layer 408 located above the analyzed layer 404 have a different partial spatial overlap and FIG. 4D illustrates an example where layers 400, 404 and 408 almost have no spatial overlap between them.

The relation between the layers is not necessarily consistent for the entire printed layer, and two neighbor layers can have more than one spatial relationship between them. For example, layers 400, 404 and 408 shown in FIG. 4D as not having a spatial overlap between them may continue and sometimes along the layer have an overlap between them and the layers can even intersect.

In order to provide a support structure for the 3D object being printed processor 332 can analyze the 3D object shape and relation between the neighbor layers 400 and 404 or 404 and 408 and determines the type and location of shell weak spot and the support structure to be introduced to support the identified gaps and/or shell weak spots. In course of the analyses one of the layers can be set as a layer I (analyzed layer) in relation to which the analyses take place. As printing of the 3D object continues, the analyzed layer also changes and another layer replaces layer I as the analyzed layer.

As shown in the example of FIG. 4B when a layer 400 located below analyzed layer 404 and the analyzed layer 404 have at least a partial spatial overlap, processor 332 generates an inner support structure supporting analyzed layer 404. When a layer 408 located above analyzed layer 404 and the analyzed layer 404 have at least a partial spatial overlap, processor 332 generates an inner support structure supporting the layer above the analyzed layer. When a layer 400 or 408 neighboring analyzed layer 404 and analyzed layer 404 have no spatial overlap (FIG. 4D), processor 332 can identify the area lacking overlap as a shell weak spot and can use the analyzed layer to generate an outward support structure supporting both layers.

As illustrated in FIG. 4D shell weak spot 420 and 424 could be quite large and could exceed the size of a neighbor layer. The space determined as shell weak spot could be filled by copying a fragment of a missing or improper located layer, as many times as it is necessary to fill this space.

In all of the examples disclosed the morphology/topography of a support structure can be identical to the morphology/topography of the 3D object or closely follow the morphology/topography of the 3D object. Although, it is sufficient to deposit fragmented layers or segments of support structure layers only, the support structure layers could be deposited in a continuous deposition mode, at the expense of increase of the support structure size. Close located segments or fragments of the layer could be connected, even when there is no need in support between the layers. This simplifies the printing and improves the quality and strength of the support structure.

FIGS. 5A-5C show schematic illustrations of stages in printing an inner support structure according to an example. FIG. 5A illustrates two printed layers 502 and 506 and a number of gaps and shell weak spots 510 formed in course of printing between layers 502 and 506. First layer 502 of the 3D object will be printed. Then an inner support structure 516 to support layer 502 will be printed. Printing of an inner support structure proceeds from the shell into the cavity of the shell. With reference to FIG. 5B, the support structure printing order could be as follows: first layer fragment 516-1 will be printed. Layer 516-1 being in contact with layer 502 will be cured to stick to layer 502. Then the next support fragment or segment 516-2 will be printed and cured to stick to the first fragment 516-1 and so on. At last, the upper layer, layer 506 will be printed, and it will be laying on support structure 516.

Fragments 516-1 through 516-4 could be at a length sufficient to cover at least the length of the gap or shell weak spot. Extra length could be added to the fragments, for example:

In order to connect different fragments to support continuous printing.

In order to make sure that each fragment will have a long enough previous fragment, so they could stick to each other.

There could be other external reasons and constrains that will extend the fragment length.

FIG. 5C illustrates the resulting support structure 516 and layers 502 and 506. Following completion of layer 502 support structure 516 processor 332 analyzes the next layer identifies shell weak spots and issues an appropriate command to print (or generate) the support structure for the next layer. The next support structure can be an inner support structure or as noted above, it could be an outward support structure printed from the outer side of the 3D object.

Processor 332 can control the movement of the material dispensing head 326 (FIG. 3) and nozzle 320 such as their movement is a function of, for example, a gap or shell weak spots size between two neighbor layers to be printed.

To minimize the amount of material used, and the creation of areas with excessive material, processor 332 can calculate the amount of material to be deposited at every point of the layer. The calculations can take into account the amount of material placed under and near each point. Points that are laying exactly on top of each other require less support material than points that have no material underneath.

Figure 6A:
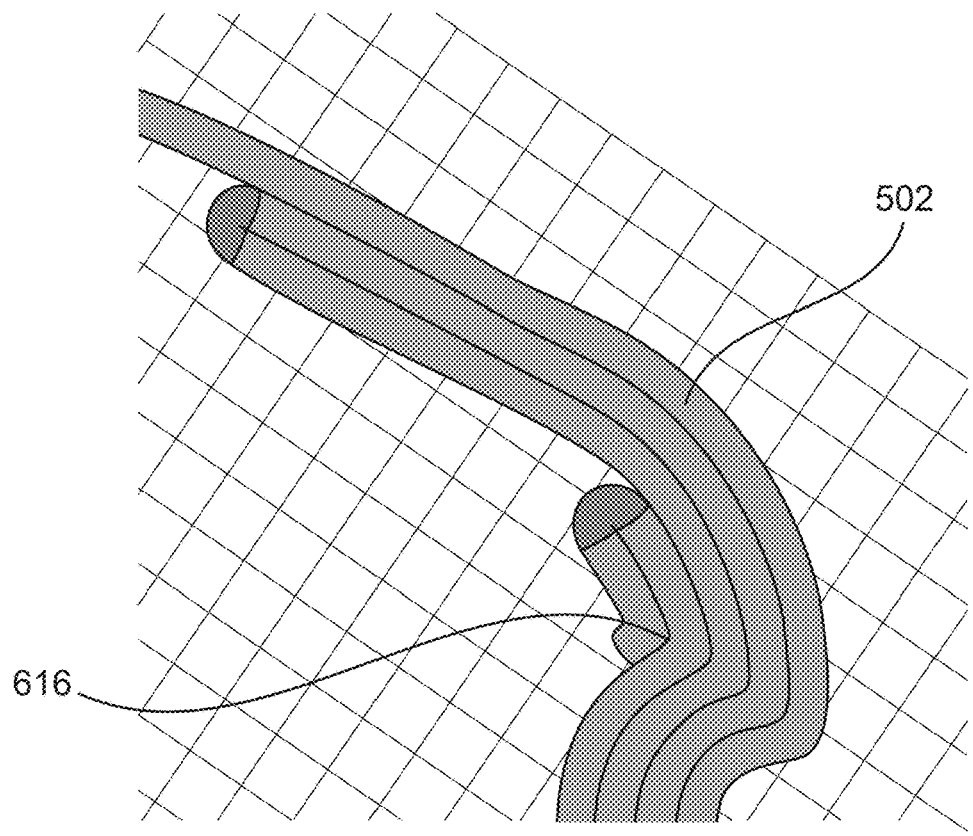
FIGS. 6A-6B are other examples of support structure printing.
Figure 6B:
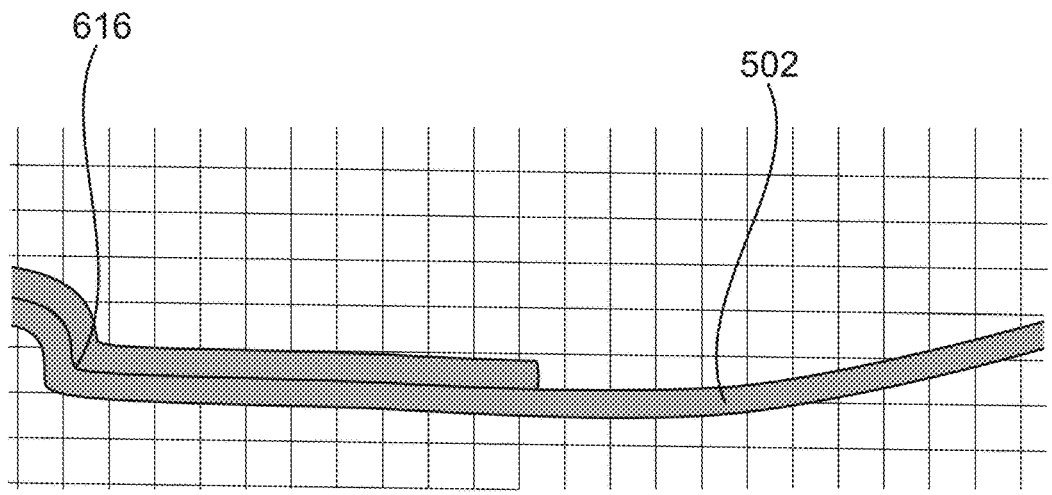

FIGS. 6A-6B show other examples of support structure printing. 3D objects could include substantial segments with curved surfaces and walls as well as walls located at 90 degrees or sharp angles with respect to each other. Printing of 3D objects segments that are at sharp angles 616 to each other could require a sharp change in the travel direction of the material dispensing nozzle and some time that could be required to slow down and change the travel direction. A slowdown in the nozzle movement also takes place when the support structure is printed as separate fragments. To prevent material in the nozzle hardening, the nozzle after each slow down or sharp travel direction change could be purged and wiped. This cleaning operation also prevents any dripping of excessive material on the model. When printed layers run across each other, nozzle, in course of movement could slightly rise, when necessary to avoid with already printed segments.

Properly designed and implemented support structure reduces the amount of material used, minimizes the cost of the 3D object and reduces printing time.

What is claimed is:

1. A method comprising:
   employing a processor to virtually slice a CAD representation of a 3D object and detecting gap and shell weak space between sliced layers;
   analyzing the gap and shell weak space between virtually sliced neighboring layers to detect a type of the gap and shell weak space between the virtually sliced neighboring layers that should be filled during printing of the 3D object;
   and generating, based on the type of the gap, at least one of an inward or an outward support segment geometry in the course of printing the 3D object,
   wherein the support segment geometry fills the gap and shell weak space and becomes an integral part of the 3D object, such that no part of the support segment geometry is removed from the 3D object.

2. The method according to claim 1 wherein spatial relation between analyzed layer and at least one neighbor layer are determining size of the gap and shell weak space.

3. The method according to claim 2 wherein when a layer below the analyzed layer and the analyzed layer have at least a partial spatial overlap, a processor generates an inward support structure supporting the analyzed layer.

4. The method according to claim 2 wherein when a layer above the analyzed layer and the analyzed layer have at least a partial spatial overlap, a processor generates an inward support structure supporting the layer above the analyzed layer.

5. The method according to claim 2 wherein when a layer neighbor to the analyzed layer and the analyzed layer have no spatial overlap, a processor uses the analyzed layer to generate an outward support structure supporting both layers.

6. The method according to claim 2 wherein when an area lacking overlap is identified as a shell weak space, a processor uses the analyzed layer to generate an outward support structure supporting the analyzed layer and a neighbor layer.

7. The method according to claim 1 wherein the support structure shape follows the shape of the 3D object.

8. The method according to claim 1 wherein a processor minimizes the amount of material used by accounting for amount of material placed under and near each point.

9. The method according to claim 1 wherein the processor is also configured to issue a command and move aside printing head and nozzle, to expose a fragment of a support structure to material solidification module to cure support structure in a shell weak space.

10. A method comprising:
    employing a processor to virtually slice a CAD representation of a 3D object and detecting gap and shell weak space between sliced layers;
    analyzing the gap and shell weak space between virtually sliced neighboring layers to detect a type of the gap and shell weak space between the virtually sliced neighboring layers that should be filled during printing of the 3D object;
    and generating, based on the type of the gap, at least one of an inward or an outward support segment geometry,
    wherein, in the course of printing, the support segment geometry fills the gap and shell weak space by printing and copying a missing fragment of a layer, multiple times.

11. A method comprising:
    employing a processor to virtually slice a CAD representation of a 3D object and detecting gap and shell weak space between sliced layers;
    analyzing the gap and shell weak space between virtually sliced neighboring layers to detect a type of the gap and shell weak space between the virtually sliced neighboring layers that should be filled during printing of the 3D object;
    and generating, based on the size of the gap and shell weak space, at least one of an inward or an outward support segment geometry in the gap and shell weak space in the course of printing the 3D object;
    wherein a morphology/topography of the inward or outward support segment geometry follows a morphology/topography of the 3D object and an entirety of the support segment geometry becomes an integral, non-removable part of the 3D object.

* * * * *